B. F. FITCH.
FREIGHT TERMINAL.
APPLICATION FILED JULY 7, 1917.
1,239,264.
Patented Sept. 4, 1917.
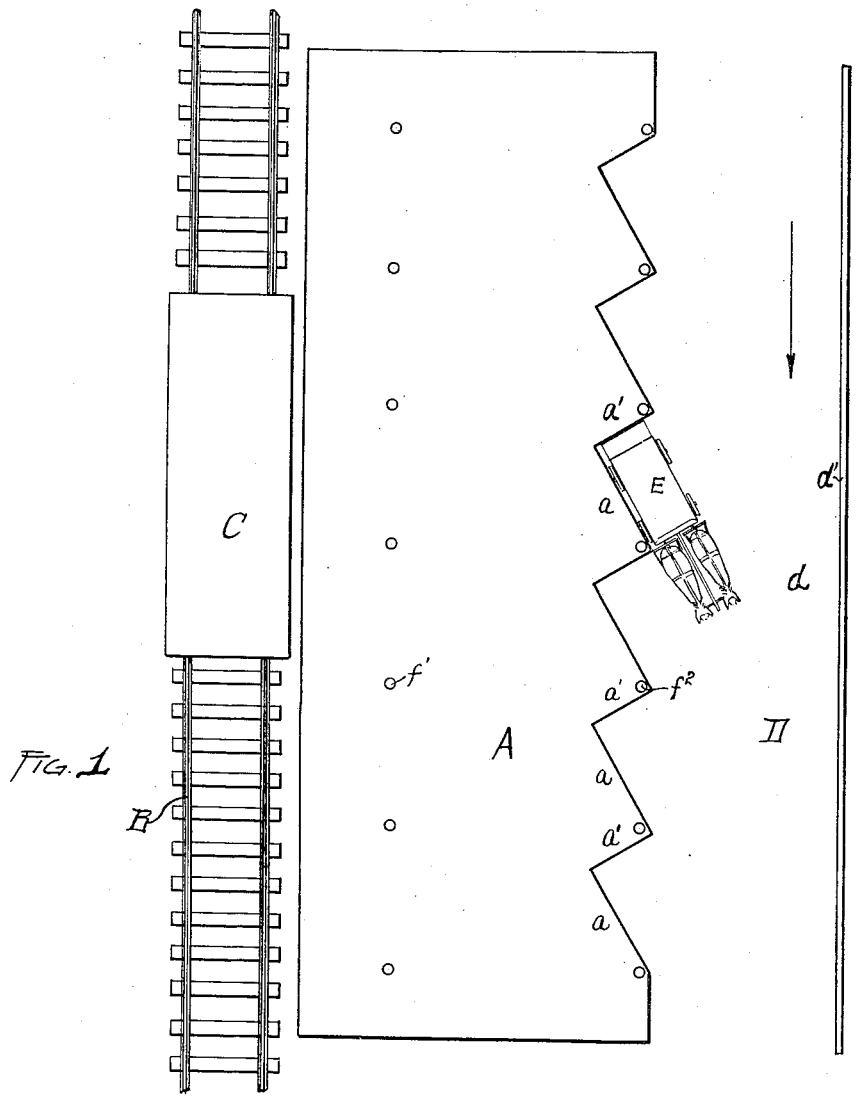
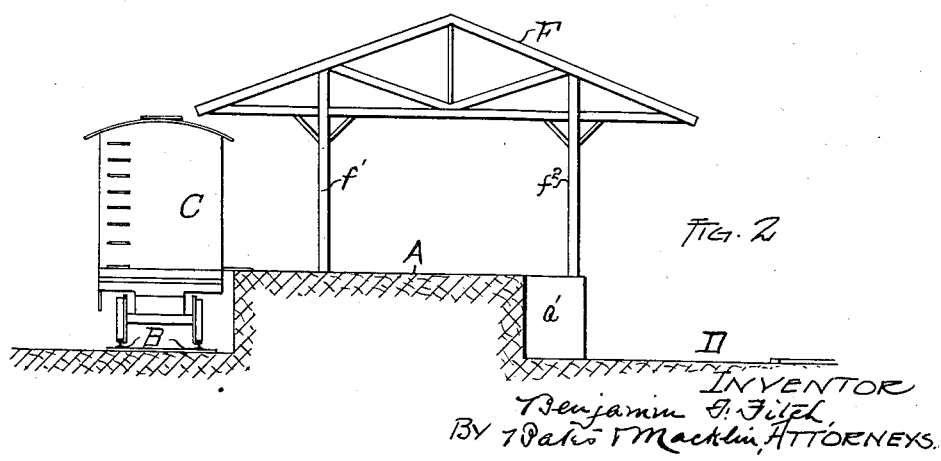
INVENTOR
Benjamin F. Fitch,
BY Parks & Macklin, ATTORNEYS.

UNITED STATES PATENT OFFICE.

BENJAMIN F. FITCH, OF EVANSTON, ILLINOIS, ASSIGNOR TO THE MOTOR TERMINALS COMPANY, OF CLEVELAND, OHIO, A CORPORATION OF OHIO.

FREIGHT-TERMINAL.

1,239,264.  Specification of Letters Patent.  Patented Sept. 4, 1917.

Application filed July 7, 1917. Serial No. 179,133.

*To all whom it may concern:*

Be it known that I, BENJAMIN F. FITCH, a citizen of the United States, residing at Evanston, in the county of Cook and State of Illinois, have invented a certain new and useful Improvement in Freight-Terminals, of which the following is a full, clear, and exact description, reference being had to the accompanying drawings.

This invention relates to freight stations where package freight is transferred from one vehicle to another across a platform. The object is to so arrange the platform and so correlate it with the vehicle spaces on either side thereof that the loading and unloading may be most efficiently and rapidly accomplished in a minimum of space.

To the above end I have provided a platform having on one side means for carrying the vehicle which is to receive or discharge the freight, as, for example, a track for freight cars, and having on the other side a passageway for coöperating vehicles, as, for example, horse teams, the edge of the latter side of the platform being arranged in saw-tooth form with alternately long and short dimensions. By this arrangement, pockets are provided on the latter side of the platform adapted to be occupied by the bodies of vehicles in such manner that the same may be readily loaded or unloaded both from the side and from the rear of the vehicle. At the same time, each vehicle is out of the way of every other vehicle, and the space required for driving to and from the platform may be reduced to a minimum.

By my arrangement the teams or individual vehicles may drive into the passageway adjacent to the saw-tooth edge of the platform and simply back into the adjacent pocket. The body portion of each of such vehicles then has its rear abutting the short side of the pocket and its side substantially coincident with the longer dimension of the pocket, the propelling means for the vehicle (perhaps a team of horses) projecting at the front of the pocket and overhanging the side of the vehicle next in front.

I provide a continuous open space, on the opposite side of the standing teams from the saw-tooth platform, into which teams may drive. Accordingly, it is very easy to drive along this space and back into any unoccupied pocket, allowing the most satisfactory loading or unloading at either the side or rear, or both at once. By inclining the pockets in the direction of traffic in the driveway, the width of the driving space is much reduced, and less "cutting" of the front wheels is necessary in backing into place, with less liability of collisions and more accurate positioning of the vehicle in the pocket. When the loading or unloading operation is completed, the team may at once drive into the continuous runway and pass on out of the station, headed in the same direction it had on entering.

The invention is illustrated in the drawings hereof, which show a raised platform, a railroad track on one side thereof, a teamway on the other side thereof, both on lower levels, the edge of the platform on the teamway side having my peculiar saw-tooth formation, as above explained. The drawings also show a roof supported over the platform and overhanging the teamway, the supporting columns for said roof being placed on one side back from the straight edge of the platform, and at the other side adjacent to the angles of the saw-tooth portion. In this position these posts are out of the way for loading or unloading at either side of the platform. All of these features are included within my invention, as summarized in the claims.

In the drawings, Figure 1 is a plan of a freight terminal according to my invention, the roof being omitted. Fig. 2 is an end elevation of such terminal.

Referring more particularly to the drawings, A indicates the raised platform across which the freight is adapted to be carried by hand trucking, B indicates a railroad track at one side thereof upon which freight cars C may run, said cars having floors on the same trucking level with the platform. D indicates the roadway for teams or other vehicles, which is on the opposite side of the platform from the track and is on about the same level as the track.

The edge of the platform adjacent to the runway D is of the peculiar saw-tooth form shown. That is to say, it is indented by vertical planes at right angles to each other, which are alternately long and short. Thus, the plane *a* may depart from the edge at an angle of about thirty degrees, and the plane *a'* (at right angles to the plane *a*) may join the theoretic edge of the platform at an angle of about sixty degrees. With such an arrangement the long sides *a* of the pockets have substantially twice the dimension of the short sides *a'*.

E indicates a wagon adapted to be backed into any of the pockets bounded by the sides *a* and *a'*. The sides of these pockets are chosen so that the long side *a* will extend substantially the full length of the wagon body, whereas the small side *a'* will extend the width of the wagon body. This enables the desired loading and unloading from both the sides and rear. The runway is wide enough to provide a clear space *d*, between the space occupied by the teams or trucks and the curb *d'*, so that the teams or trucks in position do not interfere with any other vehicle backing to the platform or pulling out from it.

It is desirable to have a roof over the raised platform A, which preferably overhangs the vehicle runway. Such a roof is indicated at F. To support it in a way which will not interfere with access to the doorways of the cars C or with the ready loading or unloading of the vehicles, I provide the supporting posts *f'* on the car side of the platform some distance back from the edge thereof, while, on the saw-tooth side, I provide the posts *f²* adjacent to the angle where the large and small sides of the pockets meet. In such position these posts are out of the way when loading or unloading from either the side or the rear of the vehicle.

Having thus described my invention, what I claim is:

1. In a freight terminal, the combination of a raised platform having vehicle spaces on its opposite sides on a lower level, one edge of said platform being indented in a saw-tooth manner by alternately long and short sides.

2. The combination of a platform having vehicle spaces on its opposite sides, one edge of said platform being indented in a saw-tooth manner by alternately long and short sides meeting each other at right angles.

3. The combination of a raised platform, means for carrying a body to be loaded or unloaded on one side of the platform parallel with it, a vehicle runway on the other side of the platform on a lower level than the platform, said platform on that side being made with a saw-tooth edge providing pockets having two sides, one of which is materially longer than the other.

4. The combination of a raised platform, the edge of the platform on one side being straight, a vehicle runway on the other side of the platform, the edge of the platform on the latter side being made saw-tooth to provide a plurality of pockets, one side of which is materially longer than the other side, the long sides of the various pockets being in parallel planes and the short sides being in parallel planes at right angles to the long sides.

5. The combination of a raised platform, a railroad track on a lower level on one side, the edge of the platform being parallel with the track on that side, a vehicle runway on a lower level on the other side of the platform, the edge of the platform on the latter side being made saw-tooth to provide a plurality of pockets, one side of which is materially longer than the other side, the long sides of the various pockets being in parallel planes and alternating with the short sides, which are in parallel planes at right angles to the planes of the long sides.

6. The combination of a raised platform, means for carrying a body to be loaded on one side of the platform on a hand trucking level therewith, a vehicle runway on the other side of the platform on a lower level than the platform, the platform on the side adjacent to the runway having a saw-tooth edge, providing pockets with sides substantially twice the length of their bases, whereby an ordinary wagon occupying any of such pockets may load or unload both from the side and from the rear.

7. The combination of an elevated platform, means for carrying a body to be loaded or unloaded at one side thereof, a vehicle runway at the other side, said platform at the latter side having a saw-tooth edge, a roof for said platform, and posts for supporting said roof, the posts at the saw-tooth side being located at angles of the teeth.

8. The combination of an elevated platform, means for carrying a body to be loaded or unloaded at one side thereof, a vehicle runway at the other side, said platform at the latter side having a saw-tooth edge, a roof for said platform, and posts for supporting said roof, the posts at the saw-tooth side being located at angles of the saw-teeth, and the posts on the other side being directly opposite the saw-teeth posts and standing back a material distance from the adjacent edge of the platform.

9. The combination of an elevated platform, a railroad track on one side thereof on a lower level, the platform on that side having a continuous vertical wall parallel with the track, a vehicle passageway on the opposite side of the platform, the platform on that side being made into pockets formed by indenting vertical planes in the edge of the platform, which planes are alternately at substantially thirty degrees and sixty degrees to the boundary of the platform on that side, supporting columns carried by the platform and arranged in pairs laterally opposite each other, one column of each pair being located adjacent to the point of a pocket and the other column standing back a material distance from the continuous edge of the platform on the other side, and a roof supported by said columns and extending on one side substantially as far as the continuous edge of the platform and on the other side materially overhanging said vehicle space.

In testimony whereof, I hereunto affix my signature.

BENJAMIN F. FITCH.